United States Patent
Chae et al.

(10) Patent No.: US 11,272,503 B2
(45) Date of Patent: Mar. 8, 2022

(54) METHOD AND APPARATUS FOR UE TRANSMITTING SIGNAL IN WIRELESS COMMUNICATION SYSTEM SUPPORTING PLURALITY OF TTI LENGTHS

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 16/627,532

(22) PCT Filed: Jul. 2, 2018

(86) PCT No.: PCT/KR2018/007479
§ 371 (c)(1),
(2) Date: Dec. 30, 2019

(87) PCT Pub. No.: WO2019/004801
PCT Pub. Date: Jan. 3, 2019

(65) Prior Publication Data
US 2020/0170009 A1    May 28, 2020

Related U.S. Application Data

(60) Provisional application No. 62/527,048, filed on Jun. 30, 2017.

(51) Int. Cl.
*H04W 72/04*  (2009.01)
*H04L 1/18*   (2006.01)
*H04L 5/00*   (2006.01)
*H04W 24/10*  (2009.01)

(52) U.S. Cl.
CPC ....... *H04W 72/0446* (2013.01); *H04L 1/1887* (2013.01); *H04L 5/0048* (2013.01);
(Continued)

(58) Field of Classification Search
CPC ......... H04W 72/0446; H04W 72/0486; H04W 72/042; H04W 24/10; H04L 1/1887; H04L 5/0048; H04L 5/0053
(Continued)

(56) References Cited

U.S. PATENT DOCUMENTS

2019/0116609 A1*  4/2019  Feng ................... H04W 72/042
2020/0112862 A1*  4/2020  Lee ....................... H04W 24/08
2021/0204282 A1*  7/2021  Lee ....................... H04W 72/10

FOREIGN PATENT DOCUMENTS

WO    WO2017099461    6/2017

OTHER PUBLICATIONS

EP Extended European Search Report in European Appln. No. 18823061.9, dated Jan. 14, 2021, 9 pages.
(Continued)

*Primary Examiner* — Peter G Solinsky
(74) *Attorney, Agent, or Firm* — Fish & Richardson P.C.

(57) ABSTRACT

An embodiment of the present invention relates to a method for a UE transmitting a signal in a wireless communication system supporting a plurality of transmission time interval (TTI) lengths, wherein the signal transmission/reception method comprises the steps of: performing a measurement for each first-TTI resource unit; selecting a first-TTI resource that is the closest to first-TTI resources having measurement results that are greater than or equal to a preset value on the time axis; and transmitting a signal using the selected first-TTI resource. The UE is capable of communicating with at least one of another UE, a UE related to an autonomous driving vehicle, the BS or a network.

13 Claims, 14 Drawing Sheets

(52) U.S. Cl.
CPC .......... *H04L 5/0053* (2013.01); *H04W 24/10* (2013.01); *H04W 72/042* (2013.01); *H04W 72/0486* (2013.01)

(58) Field of Classification Search
USPC ........................................................ 370/336
See application file for complete search history.

(56) References Cited

OTHER PUBLICATIONS

Huawei, HiSilicon, "Short TTI solutions for R15 sidelink," R1-1707006, 3GPP TSG RAN WG1 Meeting #89, Hangzhou, China, dated May 15-19, 2017, 5 pages.

Intel Corporation, "Considerations on Support of Short TTI for LTE V2V Sidelink Communication," R1-1707307, 3GPP TSG RAN WG1 Meeting #89, Hangzhou, P.R. China, dated May 15-19, 2017, 8 pages.

Xinwei, "Discussion on latency reduction of resource selection," R1-1707107, 3GPPTSG-RAN WG1 Meeting #89, 3GPPTSG-RAN WG1 Meeting #89, Hangzhou, P.R.China, dated May 15-19, 2017, 3 pages.

Xinwei, "Discussion on Short TTI in V2X Phase 2," R1-1707108, 3GPPTSG-RAN WG1 Meeting #89, Hangzhou, P.R.China, dated May 15-19, 2017, 4 pages.

Huawei, HiSilicon, "Short TTI solutions for R15 sidelink," R1-1707006, 3GPP TSG RAN WG1 Meeting #89, 3GPP TSG RAN WG1 Meeting #89, dated May 15-19, 2017, 5 pages.

PCT International Search Report and Written Opinion in International Application No. PCT/KR2018/007479, dated Oct. 12, 2018, 20 pages (with English translation).

Xinwei, "Discussion on latency reduction of resource selection," R1-1707107, 3GPP TSG-RAN WG1 Meeting #89, Hangzhou, P.R.China, dated May 15-19, 2017, 3 pages.

\* cited by examiner (a)

(b)

METHOD AND APPARATUS FOR UE TRANSMITTING SIGNAL IN WIRELESS COMMUNICATION SYSTEM SUPPORTING PLURALITY OF TTI LENGTHS

TECHNICAL FIELD

The present disclosure relates to a wireless communication system, and more particularly, to a method and apparatus for transmitting a signal by a user equipment (UE) in a wireless communication system supporting a plurality of transmission time interval (TTI) lengths.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to provide a method of efficiently using resources in a situation where multiple transmission time interval (TTI) lengths are available.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of transmitting a signal by a user equipment (UE) in a wireless communication system supporting a plurality of transmission time interval (TTI) lengths includes perform measurements in units of first-TTI resource, selecting a first-TTI resource closest, on a time axis, to a first-TTI resource having a measurement result equal to or larger than a predetermined value, and transmitting a signal in the selected first-TTI resource.

According to an embodiment of the present disclosure, a UE for transmitting and receiving a signal in a wireless communication system supporting a plurality of TTI lengths includes a transceiver and a processor. The processor is configured to perform measurements in units of each first-TTI resource, select a first-TTI resource closest, on a time axis, to a first-TTI resource having a measurement result equal to or larger than a predetermined value, and transmit a signal in the selected first-TTI resource.

The selection of a first-TTI resource may include, from among remaining first-TTI resources excluding the first-TTI resource having the measurement result equal to or larger than the predetermined value, selecting, with priority, a first-TTI resource directly close to the excluded first-TTI resource on the time axis.

Among remaining first-TTI resources excluding the first-TTI resource having the measurement result equal to or larger than the predetermined value, the UE may apply a negative offset to a measurement result of a first-TTI resource directly close, on the time axis, to the excluded first-TTI resource.

The UE may select a first-TTI resource having a smallest measurement result to which the negative offset is applied, from among the remaining first-TTI resources.

The negative offset may be determined based on a congestion level.

The size of the negative offset may be larger for a larger measurement of the directly close first-TTI resource.

A plurality of TTIs may include a first TTI corresponding to a short TTI and a second TTI corresponding to a normal TTI (nTTI).

The second TTI may include a plurality of first TTIs.

A TTI length may be configured for each resource pool.

A different TTI length may be configured for each congestion level.

The TTI length may be indicated based on a channel busy ratio (CBR) reported by the UE by a network.

Advantageous Effects

According to the disclosure, resource fragmentation may be prevented, which might otherwise be caused by resource selection of user equipments (UEs) using a short TTI (sTTI). Therefore, resources may be used efficiently.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE

Figure 1:
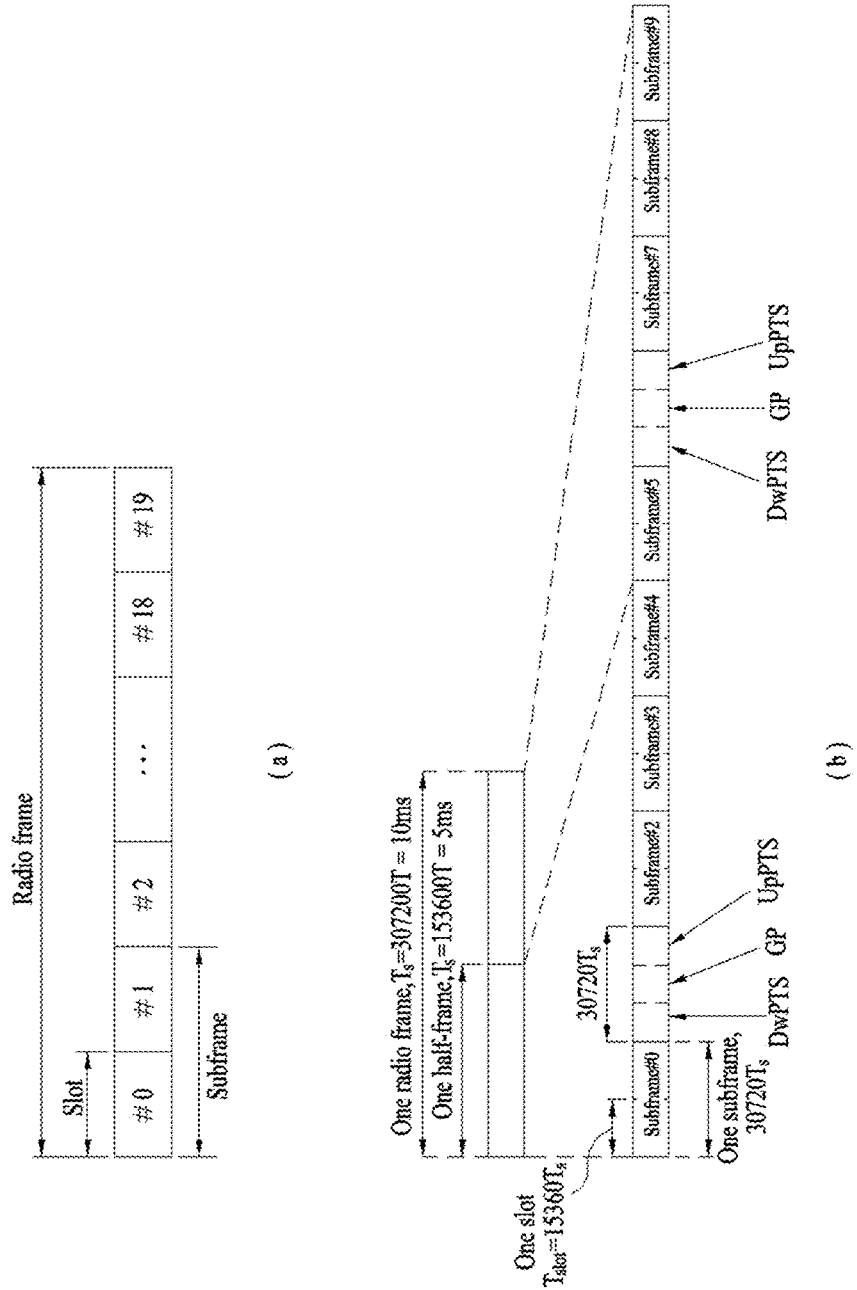
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
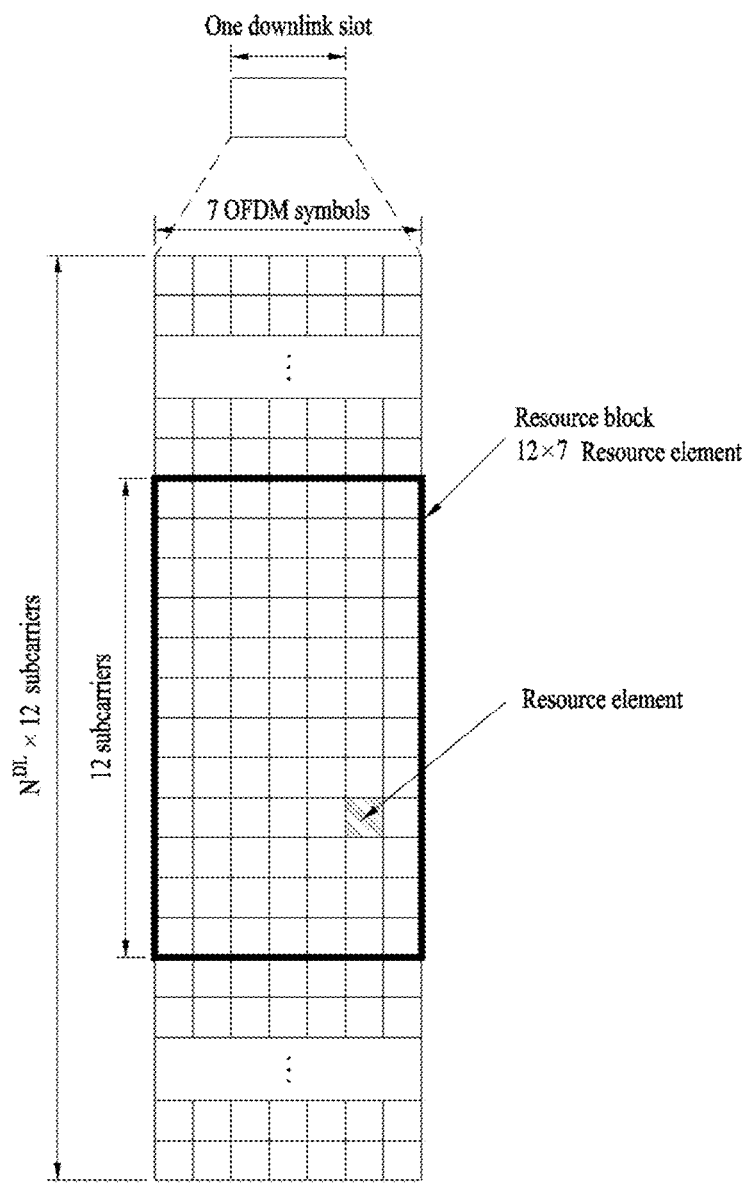
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
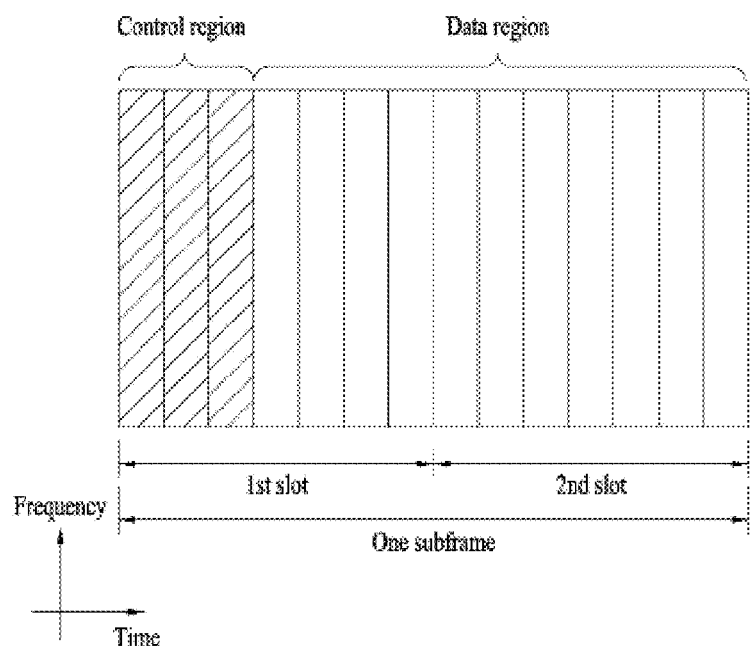
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
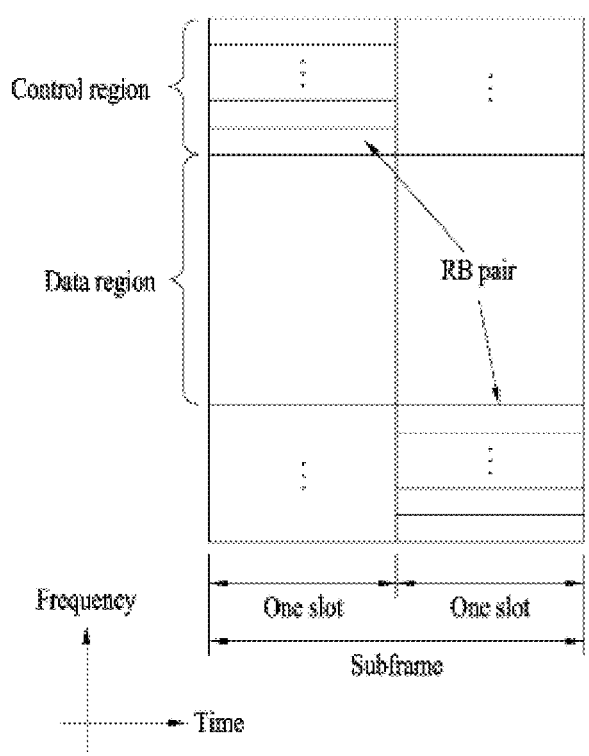
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MB SFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
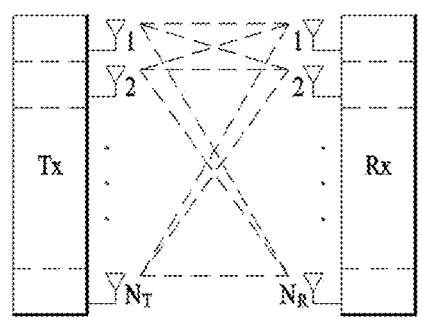
FIG. 5 is a view illustrating the configuration of a wireless communication system having multiple antennas.
Figure 5:
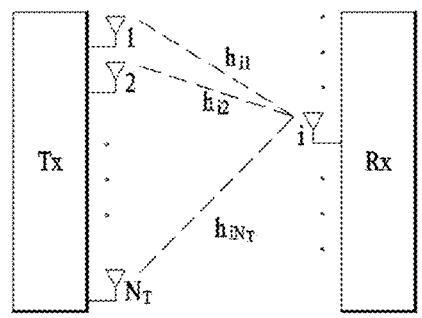

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1,n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
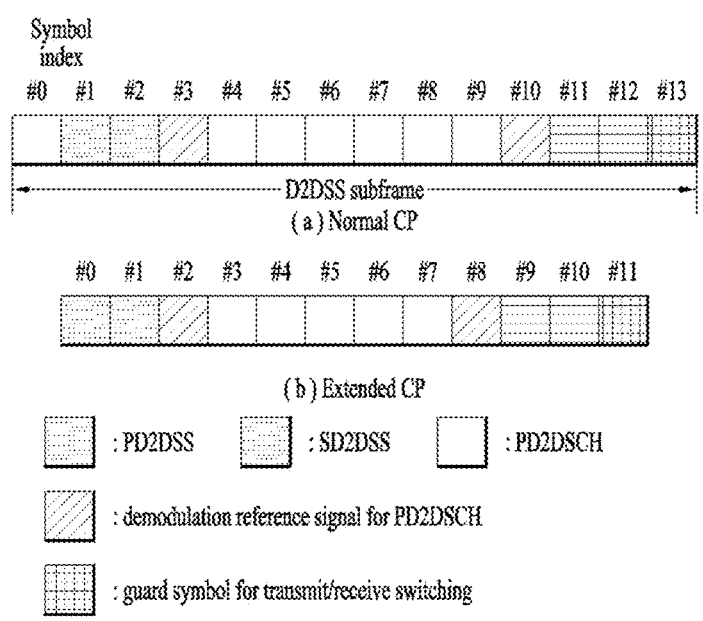
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
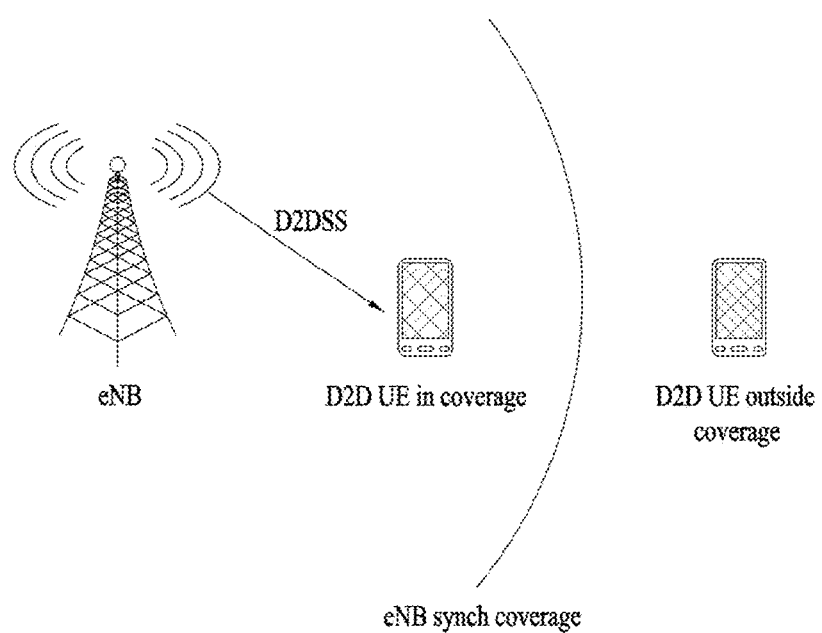
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
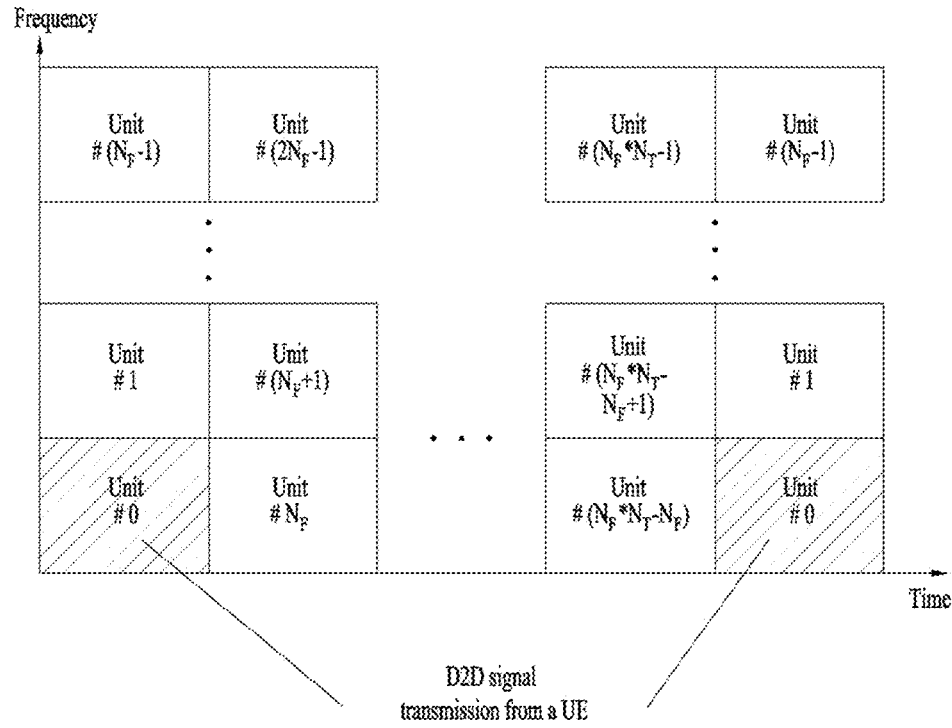
FIG. 8 is a view illustrating an exemplary D2D resource pool for D2D communication.

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
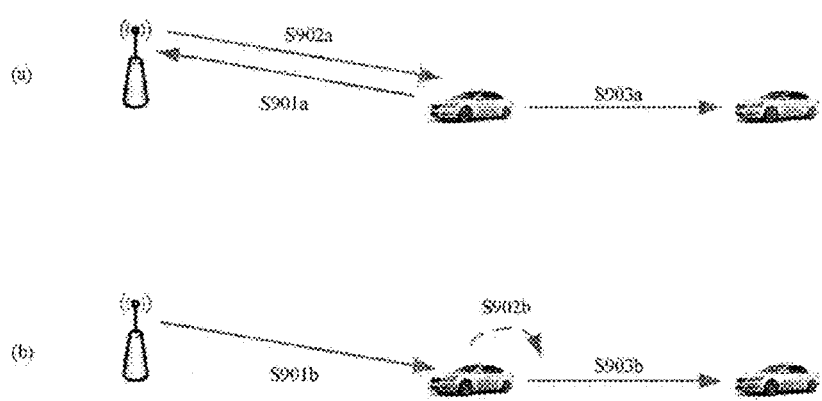
FIG. 9 is a view referred to for describing transmission modes and scheduling schemes for vehicle-to-everything (V2X)
Figure 10:
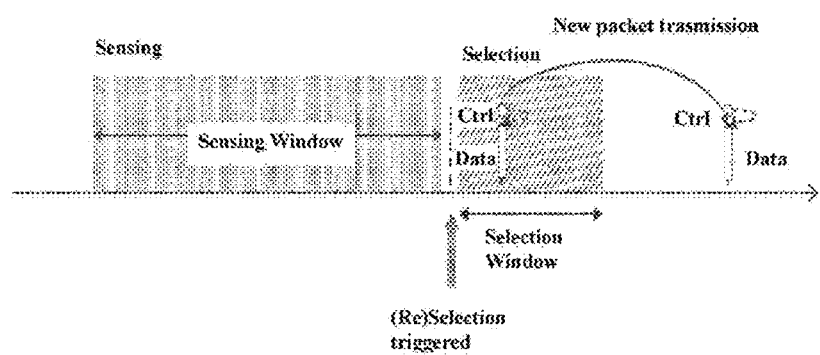
FIG. 10 is a view illustrating a method of selecting resources in V2X.
Figure 11:
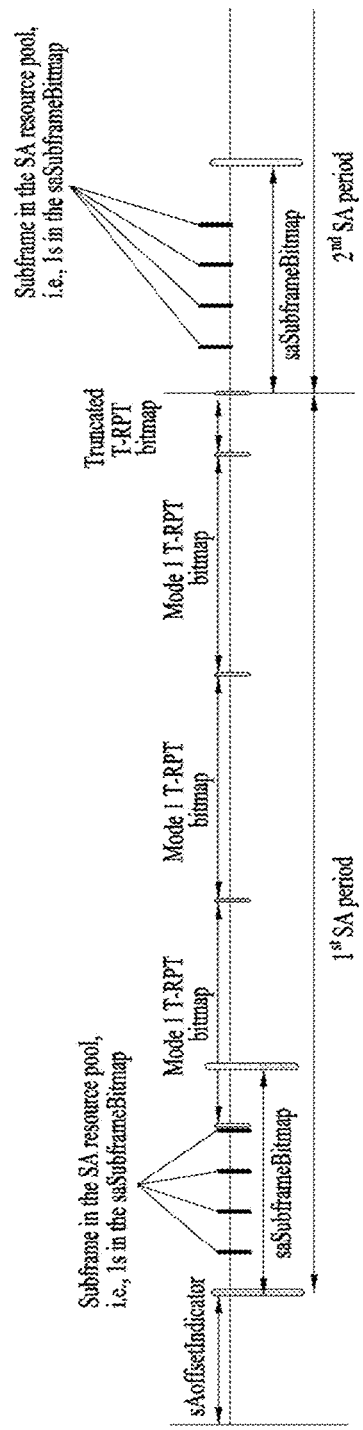
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
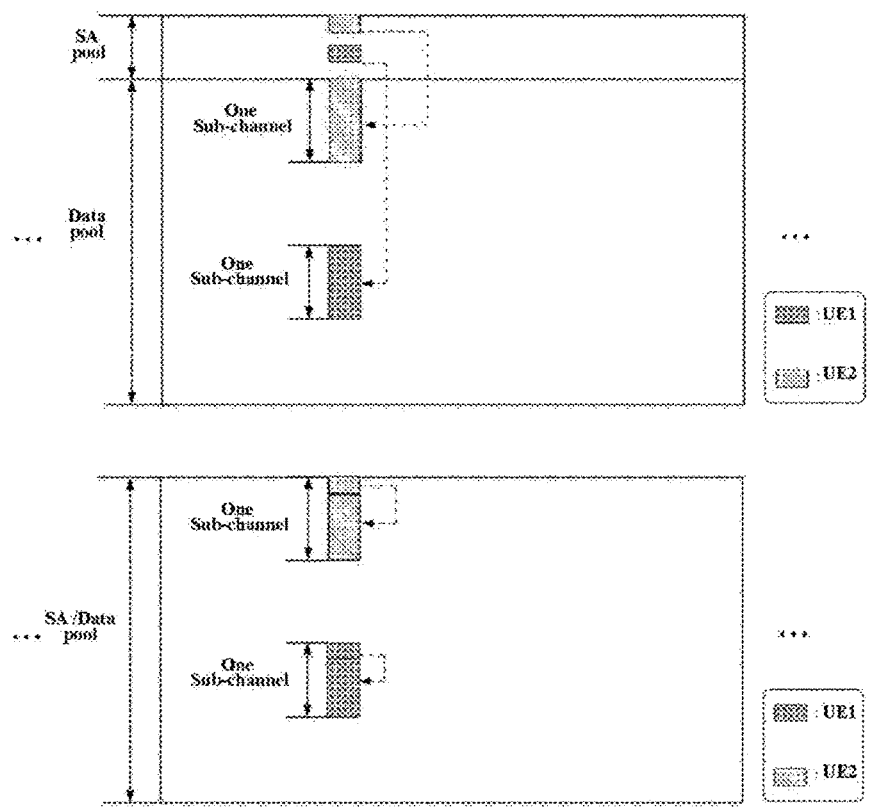
FIG. 12 is a view referred to for describing an SA and data transmission in V2X.

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as $N_R$.

Figure 13:
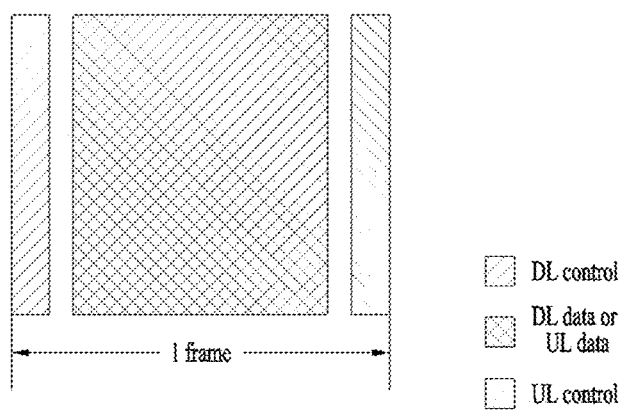
FIGS. 13 and 14 is a view illustrating a new radio access technology (NRAT) frame structure.
Figure 14:
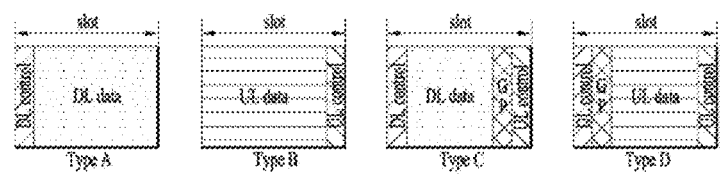

FIGS. 13 and 14 illustrate an exemplary frame structure available for $N_R$. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Embodiments

A method of transmitting a signal by a UE in a wireless communication system supporting a plurality of transmission time interval (TTI) lengths will be described below. The signal transmission may be a UL transmission from the UE to an eNB/gNB or a signal transmission from the UE to a D2D UE.

A TTI is a time interval in which a transport block is scheduled. One TTI is defined as a 1-ms subframe in the LTE/LTE-A system, which should not be construed as limiting the present disclosure. Thus, a normal TTI or long TTI (nTTI) which is 1 ms long or has any other length may be used as a reference. In the following description, an nTTI is of a basic TTI length for data transmission and reception, which is preconfigured or configured by a network. Legacy UEs are capable of transmission and reception only in an nTTI. A short TTI (sTTI) is a TTI shorter than an nTTI, and the length of one nTTI may cover the total length of a plurality of sTTIs. A subchannel refers to a group of certain frequency resources in the same TTI, and a UE may select resources in units of one or more subchannels.

When a short latency is required, an sTTI is useful. However, when an sTTI-transmitting UE selects resources indiscriminately, nTTI resources are fragmented, resulting in lack of resources for nTTI-transmitting UEs. Moreover, when a legacy UE attempts to receive a signal in a legacy TTI, an automatic gain control (AGC) tuning value may fluctuate, adversely affecting reception quality. Because it is assumed that the legacy UE performs AGC only at the start of an nTTI, indiscriminate presence of an sTTI in the middle of an nTTI may change a gain value measured by the legacy UE during the AGC in the middle of the nTTI and thus reception performance may be rapidly degraded. To solve this problem, a method of selecting TTI resources and transmitting a signal in the selected TTI resources by a UE will be described below.

According to an embodiment of the present disclosure, a specific UE may perform measurements in units of first TTI (sTTI) and select a first-TTI resource closest in the time domain to a first-TTI resource having a measurement result equal to or larger than a predetermined value (a "close" first-TTI resource may be limited to a first-TTI resource selected from among a plurality of first-TTI resources included in a specific second TTI (nTTI)). The UE may then transmit a signal in the selected first-TTI resource. The measurement of a channel state may amount to measurement of an RSRP or RSSI in each STTI and/or each subchannel in the resources of each second TTI (nTTI).

Figure 15:
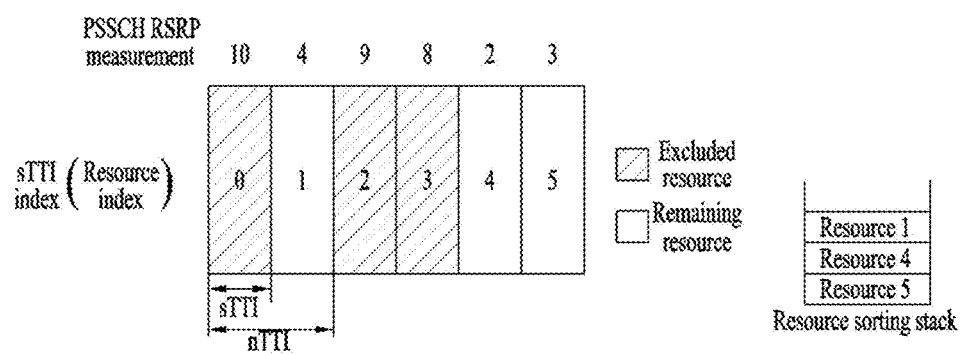
FIG. 15 is a view illustrating a method of selecting a transmission time interval (TTI) resource according to an embodiment of the present disclosure.

When it is said that the closest first-TTI resource is selected, this may imply that a first-TTI resource directly close on the time axis to (shortly before and/after) a first-TTI resource which has a measurement result equal to or larger than the predetermined value is selected with priority from among the remaining first-TTI resources. Alternatively, this may imply that when it is determined that among a plurality of first-TTI resources included in a specific second TTI (nTTI), a first-TTI resource is used by another UE (the measurement of the first-TTI resource is equal to or larger than the predetermined value), the remaining first-TTI resources have priority in selection over the first-TTI resource. Particularly, the UE may select a first-TTI resource with priority, which is close to more of excluded first-TTI resources from among first-TTI resources directly close to the excluded first-TTI resources on the time axis. For example, referring to FIG. 15, among the remaining first TTIs, TTIs 1, 4 and 5 excluding first-TTI resources, sTTIs 0, 2 and 3 having measurements equal to or larger than a predetermined value, first-TTI resources, TTIs 1 and 4 directly close to the excluded first-TTI resources on the time axis may be selected with priority. Further, a first-TTI resource, sTTI 1 close to more of the excluded first-TTI resources may be selected with further priority.

That is, a UE using an sTTI uses resources of an sTTI concatenated to another TTI in the time domain in order not to fragment resources if possible. When the UE uses a resource close to an sTTI resource used by a geographically close UE (e.g., an sTTI resource adjacent to an sTTI resource in use), a UE receiving a legacy nTTI may not perform AGC a plurality of times (or the degradation of reception performance may be reduced even though ACG is not performed a plurality of times), the reception performance of the legacy UE may be increased. To this end, a UE using an sTTI measures RSRPs or RSSIs in sTTI resources. Then the UE first selects an sTTI resource concatenated to an sTTI resource having a high RSRP or RSSI, or an unused sTTI resource close to an sTTI in use among the sTTI resources of an nTTI, when radio resources are divided into resources of nTTIs.

The above-described method of selecting TTI resources to prevent resource fragmentation may be performed by applying a negative offset to a channel state measurement result. Specifically, for example, when a 0.5-subframe TTI (sTTI) and a 1-subframe TTI (nTTI) co-exist, the RSRP or RSSI of each sTTI resource in the resources of each nTTI is measured. A resource exceeding a predetermined value (threshold) is determined to be in use and thus excluded from specific sTTIs. An sTTI resource close to the excluded sTTI resource is selected with a high probability from among the remaining sTTI resources. It is assumed that sTTI resources close to excluded sTTIs are sorted and an sTTI resource is randomly selected from among sTTI resources having RSRPs or RSSIs less than a predetermined threshold.

The UE may apply a negative offset to the measurement result of a first-TTI resource directly close to a first-TTI resource having a measurement result equal to or larger than the predetermined value, among the remaining first-TTI resources except for the first-TTI resource having a measurement result equal to or larger than the predetermined value. That is, to assign a higher selection probability to an sTTI resource close to an excluded sTTI resource, an offset is applied to the RSRP or RSSI measurement of the sTTI resource. After the RSRP or RSSI of each STTI resource is measured and a corresponding sTTI resource is excluded (i.e., an sTTI resource having a measurement result larger than the predetermined threshold is excluded), when there is any sTTI resource close to the excluded sTTI resource among the remaining sTTI resources, a negative offset is applied to the measurement of the corresponding sTTI resource so that the sTTI resource may be selected with priority. Obviously, the UE may select a first-TTI resource having a smallest measurement result from among the remaining first-TTI resources.

A different offset value may be configured for a first-TTI resource according to the measurement result of a TTI resource close to the first-TTI resource. That is, the size of a negative offset may be larger for a first-TTI resource close to a TTI resource having a larger measurement result. When the measurement of the TTI resource is larger, this means that a nearer UE uses the TTI resource. Therefore, UEs close to each other are allowed to use adjacent TTIs to measure similar AGC levels from the viewpoint of reception. Therefore, a legacy UE may easily receive a signal in the TTI even with one AGC.

The negative offset value may be determined according to a congestion level. Alternatively, the negative offset value may be preset, signaled by the network, or determined according to UE implementation.

In another specific TTI resource selection method for preventing resource fragmentation, a resource close to an sTTI already in use may be placed high on a candidate resource sorting stack (when a resource placed high on the stack has a higher probability of being selected, or when a resource is randomly selected from among resources equal to or higher than a predetermined threshold, placed high on the stack) or may be placed low on the candidate resource sorting stack (when a resource placed low on the stack has a higher probability of being selected, or when a resource is randomly selected from among resources equal to or higher than the predetermined threshold, placed low on the stack)

For example, when an RSRP or RSSI measurement of a resource (performed on a TTI basis or a subchannel basis) is larger than a predetermined threshold, the UE may determine that the resource is in use for another UE, exclude the resource, and then sort the remaining sTTI resources in a descending order of measurements on the stack (the larger the measurement, the earlier it is filled in the stack). When an sTTI adjacent to a specific sTTI is in use (when sTTIs are grouped into nTTIs and another UE is using an sTTI adjacent to a specific sTTI among the sTTIs of the same group), the sTTI is placed high on the stack. That is, an sTTI adjacent to a non-excluded sTTI is placed low on the sorting stack, whereas an sTTI adjacent to an excluded sTTI is placed high on the sorting stack (herein, it is assumed that there is a high probability that a resource placed high on the stack is selected.) When one nTTI includes multiple sTTIs, sTTIs belonging to the same nTTI may be grouped into one group. It may be generalized that as more sTTIs are excluded from the same sTTI group to which a specific sTTI belongs, the specific sTTI is placed higher on the stack.

FIG. 12 illustrates a specific example of a method of placing an sTTI close to an excluded TTI high on a resource sorting stack. As illustrated, sTTIs 0, 2, and 3 having measurement results exceeding a predetermined threshold are excluded, and an sTTI close to the excluded sTTIs among the remaining sTTIs 1, 4, and 5 is placed high on the stack. Here, since sTTI 1 is close to more of the excluded sTTIs (both immediately before and immediately after the excluded sTTIs) than sTTI 4, sTTI 1 is placed higher on the stack. Although the RSRP measurement of sTTI 1 is higher than those of sTTIs 4 and 5 and thus stronger interference is expected in sTTI 1 than in sTTIs 4 and 5, sTTI 1 is placed higher than sTTIs 4 and 5 on the resource sorting stack, so that sTTI 1 is selected and thus sTTI fragmentation is prevented.

In a specific method of selecting, with priority, an unused sTTI resource close to an already used sTTI resource, the RSRP or RSSI of each sTTI may be measured, and an sTTI resource close to a specific sTTI having an RSRP or RSSI larger than a predetermined threshold, which has an RSRP or RSSI less than the predetermined threshold (because the sTTI other than the specific sTTI should not be used) may be selected. This method may be modified such that among sTTIs having RSRPs or RSSIs which differ from each other by a predetermined threshold or larger, an sTTI having a lower measurement is selected.

The principle of using an sTTI resource close to an sTTI already in use may be applied not only in the time domain but also in the frequency domain. In addition to the method of selecting an sTTI resource concatenated to another sTTI resource as described above, this is intended to prevent selection of other resources in the frequency domain and thus lack of frequency resources caused by fragmentation of frequency resources available to an nTTI-transmitting UE.

In the afore-mentioned method of using an sTTI close to an adjacent sTTI in use, the RSRPs or RSSIs of subchannels of the adjacent sTTI are measured, and a subchannel having an RSRP or RSSI value exceeding a predetermined threshold is excluded from use. Herein, an offset is applied to the RSRP or RSSI of a subchannel in an sTTI close to the excluded subchannel such that the subchannel is selected better. Alternatively, when the measurement value of an adjacent subchannel is high and thus excluded from resources available for selection, a subchannel at the same frequency position in another sTTI is placed high on the sorting stack, so that the subchannel is selected better.

A TTI length may be configured for each resource pool or a different TTI length may be configured for each congestion level. Configuration of a TTI length will be described below.

A TTI length may be configured for each resource pool. The TTI length may be preconfigured or configured by the network. The network may signal the TTI length to be used in the corresponding resource pool by physical-layer signaling or higher-layer signaling. This method prevents UEs from using different TTIs indiscriminately. When UEs use too many TTIs, transmitting and receiving UEs should perform a measurement operation in multiple types of TTIs during sensing, thus increasing UE complexity. Accordingly, the network may configure an appropriate TTI length according to a situation to avoid an excessive increase in UE complexity.

Further, for each TTI length, the number of blind decodings for a control signal or the number of HARQ processes for data reception may be preconfigured or signaled by physical-layer signaling or higher-layer signaling from the network. The network may have (rough) knowledge of the number of UEs using a specific TTI in a specific region and configure the number of blind decodings in the specific TTI for transmitting and receiving UEs to prevent unnecessary blind decodings in the TTI. The reason for limiting the number of HARQ processes for data reception is to prevent a UE from storing too many signals only for the specific TTI in an HARQ buffer. The number of blind decodings or HARQ processes for each TTI may be different according to a UE capability. For this purpose, the UE may signal the number of blind decodings and the number of HARQ processes supported for each TTI to the network.

A different available TTI length may be configured for each congestion level. The network may signal an available TTI length (or a range of available TTI lengths) to the UE by physical-layer signaling or higher-layer signaling according to a congestion level or a measurement (e.g., channel busy ratio (CBR)) based on which a congestion level is determined. Alternatively, a TTI length (or a range of available TTI lengths) may be preconfigured according to a congestion measurement. Alternatively, the network may directly indicate a TTI length (or a range of available TTI lengths) for each resource pool. To this end, the network may receive a report of the CBR of a corresponding resource pool from the UE. As such, when the network determines a TTI length based on a measurement result from a UE and thus controls a TTI for each UE based on a different CBR measurement of the UE, indiscriminate co-existence of various TTIs in one resource pool may be prevented.

When there are different TTI lengths, a TTI length for measuring a CBR may be ambiguous. The UE may measure a CBR based on a TTI length and a subchannel size predetermined or indicated by the network (for CBR measurement), or based on the longest or shortest TTI of a corresponding resource pool. Since a CBR represents a ratio of resources used for a predetermined time, UEs may measure different CBRs on the assumption of different TTI lengths for the respective UEs. In order to prevent this phenomenon and allow the UEs to take a common behavior, a TTI length for CBR measurement may be predetermined or indicated by the network.

A different TTI length may be used according to a latency requirement. For this purpose, the network may indicate a TTI length (or a range of available TTI lengths) according to a latency requirement. UEs with tight latency requirements may generate more transmission unit resources within a latency budget, thereby reducing overlap of resources between UEs within a short resource window.

A different TTI length may be used according to a payload size. It may be regulated that an sTTI may be used for payload of a size below a predetermined threshold. For example, small payload may be transmitted fast in a short TTI. A receiving UE may also reduce latency through fast decoding for a short TTI. Alternatively, the network may signal an available TTI length (or a range of available TTI lengths) to the UE according to a payload size by physical-layer signaling or higher-layer signaling.

A different TTI length may be used according to priority. For example, a positioning/ranging signal is likely to be short in the time domain and in a wideband in the frequency domain. It is preferable that these signals are periodically transmitted and received. Nonetheless, configuring certain resources as a transmission and reception area for the positioning/ranging signal at all times may cause a waste of resources (especially when there are no UEs transmitting and receiving ranging signals in the vicinity). Therefore, it is preferable that signals with different characteristics/purposes coexist in one resource pool. It is suggested that a specific TTI length and/or a specific type of message (e.g., a positioning/ranging signal) is treated with priority. Neighboring UEs select resources by avoiding this type of signal, when a specific TTI has high priority.

In another method, it may be pre-indicated (by the network) (or preconfigured) to UEs that a high-priority signal is transmitted in a specific time resource area, and it may be determined whether to use the resources for a low-priority signal depending on whether the signal is transmitted in this time resource area. For example, a certain time resource area is preconfigured as a potential ranging/positioning signal transmission area, and neighboring UEs determine whether a signal is being transmitted in this resource area (by measuring the RSSI or RSRP/RSRQ of the resource area or measuring the SINR, reference signal power, or pathloss of the resource area, and determining that a signal is being transmitted in the resource area, when the measurement exceeds a predetermined threshold). When it is determined that a signal is being transmitted in the resource area, the resources may not be used, and when a signal is not being transmitted in the resource area, the resources may be used.

This method may be generalized as a method of predetermining a priority for each time resource area and an available TTI or TTI range for the time resource area. To this end, a priority, TTI, or TTI range for each time resource area may be signaled by physical-layer signaling or higher-layer signaling from the network.

When transmitting a signal serving a specific purpose, a UE may directly indicate the priority level of the signal in a control signal to a neighboring UE. However, because the control signal may not be transmitted separately for the signal serving the specific purpose, a specific time resource area may be preconfigured as a transmission area for the signal of the specific purpose or a signal with a specific priority.

Alternatively, for a signal of a specific purpose, a control signal and the signal may be multiplexed in TDM in different TTIs. For example, a positioning/ranging signal may be transmitted in an sTTI, and a control signal indicating transmission of the positioning/ranging signal may be transmitted a predetermined time earlier in a normal TTI or a TTI of a length predetermined by the network.

With the above methods taken in combination, the UE may determine a TTI length. For example, when a latency requirement is below a predetermined threshold and a predetermined or higher priority level is used, a TTI length or TTI length range may be signaled by the network.

In another resource allocation scheme, the network may semi-statically configure an available TTI length for each time resource. A time resource area available for a UE using a specific TTI length (e.g., sTTI) in a resource pool may be predetermined or signaled by the network. When the UE transmits an sTTI signal, the UE may determine an sTTI resource in the indicated time resource area, for use in the transmission. A UE using an nTTI is not prohibited from transmitting a signal in the time resource area available to the UE using the sTTI. That is, although the nTTI-using UE may use resources of the sTTI-using UE, the sTTI-using UE does not use nTTI resources indiscriminately. Therefore, resource fragmentation caused by use of an sTTI may be suppressed.

In this method, an available TTI or a range of available TTIs may be predetermined for each time resource by the network. For example, the network may signal a bitmap of nTTIs (e.g., 10 nTTIs in a bitmap of 10 bits) to allow sTTI transmission in a time resource area corresponding to 1 in the bitmap and only nTTI transmission in a time area corresponding to 0 in the bitmap. This may be extended to network signaling of an available TTI length and/or an available TTI length range for each time resource.

It is proposed that a UE using an sTTI first uses the starting part of a TTI group (on the time axis) if possible. To this end, a different offset may be applied to the measurement value of an sTTI disposed at the start of the time area of the TTI group. For example, when multiple sTTIs are included in the area of one nTTI, a larger offset is used for a starting sTTI. Alternatively, a starting sTTI in the time domain may be placed high on a resource sorting stack. This is intended to maintain AGC in an area with no sTTI transmission and thus minimize AGC performance degradation by allowing a UE using an sTTI to use a starting sTTI with priority over an ending sTTI, even though a legacy UE performs AGC only at the start of an nTTI, on the assumption that legacy UEs perform AGC only at the start of the nTTI.

The above description may be used in uplink or downlink, not limited to direct communication between UEs, and a BS or a relay node may also use the proposed method.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB, or is requested to a receiving UE or a transmitting UE by the transmitting UE or the receiving UE.

Apparatus Configurations According to Embodiment of the Present Disclosure

Figure 16:
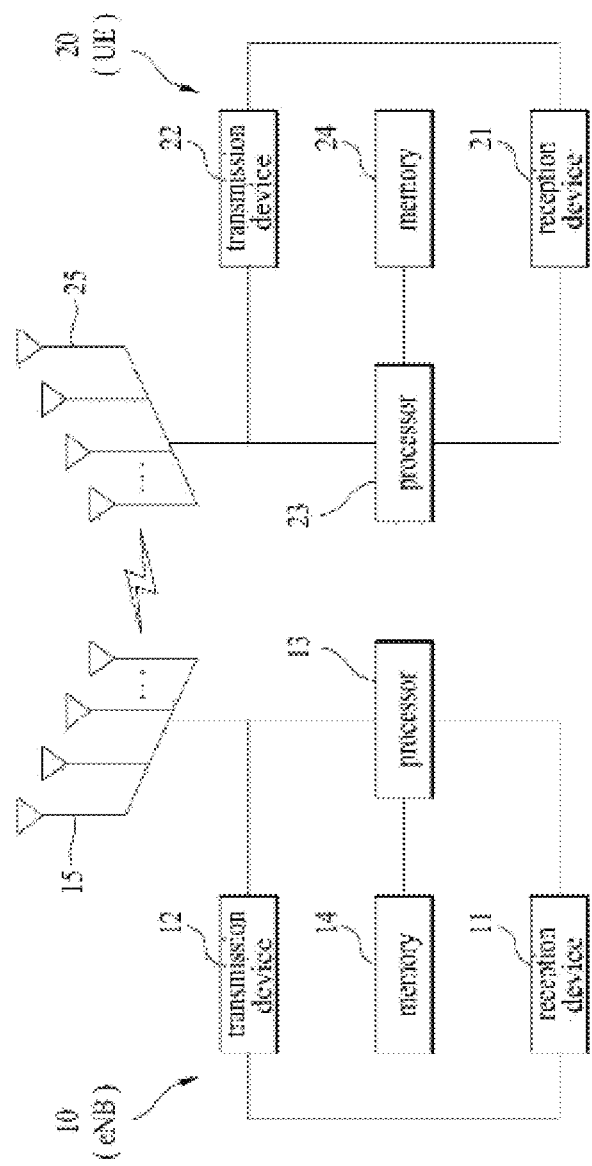
FIG. 16 is a block diagram illustrating a transmission apparatus and a reception apparatus.

FIG. 16 is a block diagram of a transmission point and a UE according to an embodiment of the present disclosure.

Referring to FIG. 16, a transmission point 10 according to the present disclosure may include a receiving device 11, a transmitting device 12, a processor 13, a memory 14, and a plurality of antennas 15. Use of the plurality of antennas 15 means that the transmission point 10 supports MIMO transmission and reception. The receiving device 11 may receive various UL signals, data, and information from a UE. The transmitting device 12 may transmit various DL signals, data, and information to a UE. The processor 13 may provide overall control to the transmission point 10.

The processor 13 of the transmission point 10 according to an embodiment of the present disclosure may process requirements for each of the foregoing embodiments.

The processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 16, a UE 20 according to the present disclosure may include a receiving device 21, a transmitting device 22, a processor 23, a memory 24, and a plurality of antennas 15. Use of the plurality of antennas 25 means that the UE 20 supports MIMO transmission and reception. The receiving device 21 may receive various DL signals, data, and information from an eNB. The transmitting device 22 may transmit various UL signals, data, and information to an eNB. The processor 23 may provide overall control to the UE 20.

The processor 23 of the UE 20 according to an embodiment of the present disclosure may process requirements for each of the foregoing embodiments. Specifically, the processor may perform measurements in units of first-TTI resource, select a first-TTI resource close to a first-TTI resource having a measurement result equal to or larger a predetermined value, and transmit a signal in the selected first-TTI resource.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point and the UE may be implemented such that the details described in the various embodiments of the present disclosure may be applied independently or implemented such that two or more of the embodiments are applied at the same time. For clarity, a redundant description is omitted.

In the example of FIG. 16, the description of the transmission point 10 may also be applied to a relay as a DL transmission entity or a UL reception entity, and the description of the UE 20 may also be applied to a relay as a DL reception entity or a UL transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a signal by a user equipment (UE) in a wireless communication system supporting a plurality of transmission time interval (TTI) lengths, the method comprising:
performing measurements in units of first-TTI resource;
selecting a first-TTI resource closest, on a time axis, to a first-TTI resource having a measurement result equal to or larger than a predetermined value; and
transmitting a signal in the selected first-TTI resource,
wherein among remaining first-TTI resources excluding the first-TTI resource having the measurement result equal to or larger than the predetermined value, the UE applies a negative offset to a measurement result of a first-TTI resource directly close, on the time axis, to the excluded first-TTI resource.

2. The method according to claim 1, wherein the selection of a first-TTI resource comprises, from among remaining first-TTI resources excluding the first-TTI resource having the measurement result equal to or larger than the predetermined value, selecting, with priority, a first-TTI resource directly close to the excluded first-TTI resource on the time axis.

3. The method according to claim 1, wherein the UE selects a first-TTI resource having a smallest measurement result to which the negative offset is applied, from among the remaining first-TTI resources.

4. The method according to claim 1, wherein the negative offset is determined based on a congestion level.

5. The method according to claim 4, wherein the size of the negative offset is larger for a larger measurement of the directly close first-TTI resource.

6. The method according to claim 1, wherein a plurality of TTIs include a first TTI corresponding to a short TTI and a second TTI corresponding to a normal TTI (nTTI).

7. The method according to claim 6, wherein the second TTI includes a plurality of first TTIs.

8. The method according to claim 1, wherein a TTI length is configured for each resource pool.

9. The method according to claim 8, wherein the TTI length is indicated based on a channel busy ratio (CBR) reported by the UE by a network.

10. The method according to claim 1, wherein a different TTI length is configured for each congestion level.

11. A user equipment (UE) for transmitting and receiving a signal in a wireless communication system supporting a plurality of transmission time interval (TTI) lengths, the UE comprising:
a transceiver; and
a processor,
wherein the processor is configured to perform measurements in units of first-TTI resource, select a first-TTI resource closest, on a time axis, to a first-TTI resource having a measurement result equal to or larger than a predetermined value, and transmit a signal in the selected first-TTI resource,
wherein among remaining first-TTI resources excluding the first-TTI resource having the measurement result equal to or larger than the predetermined value, the UE applies a negative offset to a measurement result of a first-TTI resource directly close, on the time axis, to the excluded first-TTI resource.

12. The UE according to claim 11, wherein selecting a first-TTI resource corresponds to, from among remaining first-TTI resources excluding the first-TTI resource having the measurement result equal to or larger than the predetermined value, select, with priority, a first-TTI resource directly close to the excluded first-TTI resource on the time axis.

13. The UE of claim 11, wherein the UE is capable of communicating with at least one of another UE, a UE related to an autonomous driving vehicle, a base station (BS), or a network.

* * * * *